United States Patent
Yun et al.

(10) Patent No.: US 7,944,522 B2
(45) Date of Patent: May 17, 2011

(54) COMPUTER HAVING LIQUID CRYSTAL DISPLAY

(75) Inventors: Hee Young Yun, Kumi-shi (KR); Kyo Hun Moon, Kimcheon-shi (KR); Byeong Yun Lee, Suwon-shi (KR); Yong Bum Kim, Kumi-shi (KR); Young Un Bang, Ansan-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/907,185

(22) Filed: Oct. 19, 2010

(65) Prior Publication Data
US 2011/0032448 A1 Feb. 10, 2011

Related U.S. Application Data

(63) Continuation of application No. 10/068,847, filed on Feb. 11, 2002, which is a continuation of application No. 09/326,540, filed on Jun. 7, 1999, now Pat. No. 6,373,537, which is a continuation of application No. 09/145,357, filed on Sep. 1, 1998, now Pat. No. 5,926,237, which is a continuation of application No. 08/888,164, filed on Jul. 3, 1997, now Pat. No. 5,835,139.

(30) Foreign Application Priority Data

Apr. 8, 1997 (KR) .................................. 97-12899
Apr. 17, 1997 (KR) .................................. 97-14278

(51) Int. Cl.
*G02F 1/1333* (2006.01)
(52) U.S. Cl. ......................................................... 349/58
(58) Field of Classification Search ...................... 349/58
See application file for complete search history.

(56) References Cited

U.S. PATENT DOCUMENTS

| | | | |
|---|---|---|---|
| 4,111,533 A | 9/1978 | Nakamura et al. | |
| 4,165,607 A | 8/1979 | Fedorowicz et al. | |
| 4,422,728 A | 12/1983 | Andreaggi | 349/60 |
| 4,755,035 A | 7/1988 | Kopish et al. | |
| 4,781,422 A | 11/1988 | Kimble et al. | |
| 4,796,977 A | 1/1989 | Drake | |
| 4,937,709 A | 6/1990 | Yanagi et al. | |

(Continued)

FOREIGN PATENT DOCUMENTS

DE 41 20 950 12/1992

(Continued)

OTHER PUBLICATIONS

Under Seal—"Expert Report of Robert Smith-Gillespie on Liquid Crystal Displays"; *LG. Philips LCD Co., Ltd.* v. *Tatung Company of America, et al.*, CV 02-6775 CBM (JTLx), undated (16 pgs.).

(Continued)

*Primary Examiner* — James A Dudek
(74) *Attorney, Agent, or Firm* — McKenna Long & Aldridge LLP

(57) ABSTRACT

A liquid crystal display device includes a liquid crystal panel having a display area, a light source joined with the liquid crystal panel, a first frame coupled to a surface of the light unit and sides of the liquid crystal panel, a second frame coupled to edges of the liquid crystal panel and sides of the first support frame, an outer casing, and a fastening part joining together the first support frame, the second support frame, and the outer casing through the sides of the first support frame, the second support frame, and the outer casing.

10 Claims, 9 Drawing Sheets

U.S. PATENT DOCUMENTS

| | | |
|---|---|---|
| 4,959,887 A | 10/1990 | Gruenberg et al. |
| 5,002,368 A | 3/1991 | Anglin |
| 5,102,084 A | 4/1992 | Park |
| 5,103,377 A | 4/1992 | Kobayashi |
| 5,168,426 A | 12/1992 | Hoving et al. |
| 5,173,837 A | 12/1992 | Blackwell et al. |
| 5,195,213 A | 3/1993 | Ohgami et al. |
| 5,216,411 A | 6/1993 | Ashitomi et al. |
| 5,233,502 A | 8/1993 | Beatty et al. |
| 5,238,421 A | 8/1993 | Kobayashi |
| 5,264,992 A | 11/1993 | Hogdahl et al. |
| 5,268,816 A | 12/1993 | Abell, Jr. et al. |
| 5,268,817 A | 12/1993 | Miyagawa et al. |
| 5,276,589 A | 1/1994 | Bartlett et al. |
| 5,313,318 A | 5/1994 | Gruenberg et al. |
| 5,328,379 A | 7/1994 | Kobayashi |
| 5,363,227 A | 11/1994 | Ichikawa et al. |
| 5,375,005 A | 12/1994 | Komano |
| 5,379,187 A | 1/1995 | Fujimori et al. |
| 5,422,751 A | 6/1995 | Lewis et al. |
| 5,432,626 A | 7/1995 | Sasuga et al. .............. 349/58 |
| 5,467,106 A | 11/1995 | Salomon |
| 5,467,504 A | 11/1995 | Yang |
| 5,479,285 A | 12/1995 | Burke |
| 5,486,942 A | 1/1996 | Ichikawa et al. |
| 5,494,447 A | 2/1996 | Zaidan |
| 5,504,605 A | 4/1996 | Sakurna et al. |
| 5,559,670 A | 9/1996 | Flint et al. |
| 5,566,048 A | 10/1996 | Esterberg et al. |
| 5,568,357 A | 10/1996 | Kochis et al. |
| 5,570,267 A | 10/1996 | Ma |
| 5,594,574 A | 1/1997 | Lara et al. |
| 5,619,351 A | 4/1997 | Funamoto et al. |
| 5,634,351 A | 6/1997 | Larson et al. |
| 5,636,101 A | 6/1997 | Bonsall et al. |
| 5,636,102 A | 6/1997 | Fujino et al. |
| 5,644,516 A | 7/1997 | Podwalny et al. |
| 5,654,779 A | 8/1997 | Nakayama et al. |
| 5,666,172 A | 9/1997 | Ida et al. |
| 5,666,261 A | 9/1997 | Aguilera |
| 5,680,183 A | 10/1997 | Sasuga et al. |
| 5,682,645 A | 11/1997 | Watabe et al. |
| 5,717,566 A | 2/1998 | Tao |
| 5,771,539 A | 6/1998 | Wahlstedt et al. |
| 5,777,704 A | 7/1998 | Selker |
| 5,815,225 A | 9/1998 | Nelson |
| 5,825,613 A | 10/1998 | Holden |
| 5,835,139 A | 11/1998 | Yun et al. |
| 5,844,774 A | 12/1998 | Gushiken et al. .............. 361/681 |
| 5,872,006 A | 2/1999 | Kim |
| 5,872,604 A | 2/1999 | Kim |
| 5,872,606 A | 2/1999 | Kim |
| 5,905,550 A | 5/1999 | Ohgami et al. |
| 5,926,237 A | 7/1999 | Yun et al. |
| 6,002,457 A | 12/1999 | Yun et al. |
| 6,002,582 A | 12/1999 | Yeager et al. |
| 6,020,942 A | 2/2000 | Yun et al. |
| 6,064,565 A | 5/2000 | Ishihara et al. |
| 6,144,423 A | 11/2000 | Kim |
| 6,304,432 B1 | 10/2001 | Kim |
| 6,330,148 B1 | 12/2001 | Won et al. |
| 6,373,537 B2 | 4/2002 | Yun et al. |
| 6,411,501 B1 | 6/2002 | Cho |
| 6,498,718 B1 | 12/2002 | Kim et al. |
| 6,501,641 B1 | 12/2002 | Kim et al. |
| 6,512,558 B2 | 1/2003 | Kim |
| 6,618,240 B1 | 9/2003 | Kim |
| 6,693,794 B2 | 2/2004 | Kim |
| 6,838,810 B1 | 1/2005 | Bovio et al. |
| 2003/0189681 A1 | 10/2003 | Han et al. |

FOREIGN PATENT DOCUMENTS

| | | |
|---|---|---|
| EP | 0 317 261 | 5/1989 |
| EP | 0 425 793 | 6/1991 |
| EP | 0 454 120 | 10/1991 |
| EP | 0 532 284 | 3/1993 |
| EP | 05080334 | 4/1993 |
| EP | 0 587 144 | 3/1994 |
| EP | 0 604 872 | 7/1994 |
| EP | 0 604 872 A1 | 7/1994 |
| EP | 0 620 473 | 10/1994 |
| EP | 0 880 049 A1 | 11/1998 |
| EP | 1 052 536 A3 | 2/2001 |
| GB | 2 305 689 | 4/1997 |
| GB | 2 305 690 | 4/1997 |
| JP | H08-211964 | 9/1977 |
| JP | S52-045367 | 9/1977 |
| JP | S59-020273 | 2/1984 |
| JP | S62-137479 | 8/1987 |
| JP | S62-269931 | 11/1987 |
| JP | H01-211721 | 8/1989 |
| JP | 01-237591 | 9/1989 |
| JP | H02-079893 | 3/1990 |
| JP | H02-083573 | 6/1990 |
| JP | H02-244190 | 9/1990 |
| JP | H03-156488 | 7/1991 |
| JP | H03-200282 A | 9/1991 |
| JP | H04-020086 | 2/1992 |
| JP | H04-051595 | 2/1992 |
| JP | H04-056822 A | 2/1992 |
| JP | 5-42853 | 2/1993 |
| JP | 05-080334 | 2/1993 |
| JP | H06-021018 | 3/1994 |
| JP | H03 001011 | 6/1994 |
| JP | H06-348364 | 12/1994 |
| JP | 07-099394 | 4/1995 |
| JP | 07099394 | 4/1995 |
| JP | 07-199180 | 8/1995 |
| JP | 07-281184 | 10/1995 |
| JP | H07-261187 | 10/1995 |
| JP | H07-044577 | 11/1995 |
| JP | H07-044579 | 11/1995 |
| JP | H09-026753 | 1/1997 |
| JP | H09-199875 | 7/1997 |
| JP | H09-297542 | 11/1997 |
| JP | H09-311319 | 12/1997 |
| JP | H10-301095 | 11/1998 |
| KR | 2003-0080125 | 10/2003 |
| KR | 2003-0080126 | 10/2003 |
| WO | WO 96/27147 | 9/1996 |

OTHER PUBLICATIONS

Under Seal—Joint Claim Construction Statement—Exhibit A (Agreed Construction); U.S. Patent No. 6,373,537; U.S. Patent No. 6,020,942; U.S. Patent No. 6,002,457; and U.S. Patent. No. 5,926,237 (not dated) (5 pgs.).

Under Seal—Joint Claim Construction Statement—Exhibit B (Disputed Construction), U.S. Patent No. 6,373,537; U.S. Patent No. 6,020,942; U.S. Patent No. 6,002,457; and U.S. Patent No. 5,926,237 (48 pgs.).

Under Seal—Corrected [Proposed] Separate Statement of Uncontroverted Facts and Conclusions of Law in Support of Motion of Defendants Tatung Co. and Tatung Co. of America for Summary Judgment, or in the alternative, for Partial Summary Judgment of Invalidity of '457 and '237 Patents; *LG. Philips LCD Co., Ltd.* v. *Tatung Company of America*, et al., CV 02-6775 CMB (JTLx), U.S. Dist. (C.Cal. 2002) (28 pgs.).

Under Seal—Corrected Memorandum of Points and Authorities in Support of Motion of Defendants Tatung Co. and Tatung Co. of America for Summary Judgment, or in the alternative, for Partial Summary Judgment of Invalidity of '457 and '237 Patents; *LG. Philips LCD Co., Ltd.* v. *Tatung Company of America*, et al., CV 02-6775 CMB (JTLx), U.S. Dist. (C.Cal. 2002), dated Nov. 15, 2005, including Cert. of Service (26 pgs.).

Under Seal—LG. Philips LCD Co., Ltd's Memorandum of Points and Authorities in Support of Motion for Partial Summary Judgment of Infringement of USP Nos. '237, 457, and '537 (Side-Mount Patents), *LG.Philips LCD Co., Ltd.* v. *Tatung Company of America*, et al., CV 02-6775 CMB (JTLx), U.S. Dist. (C.Cal. 2002) dated Nov. 15, 2005 (30 pgs.).

Under Seal—Declaration of David M. Morris in Support of Opposition to Defendant's Motion for Summary Judgment of Invalidity for the Side Mount Patents for Anticipation; *LG. Philips LCD Co., Ltd.* v. *Tatung Company of America*, et al., CV 02-6775 CBM (JTLx), U.S. Dist. (C.Cal. 2002), dated Dec. 1, 2005 (3 pgs.).

Under Seal—LG. Philips LCD Co., Ltd's Memorandum of points & Authorities in Opposition to Defendants' Opposition to Defendants' Motion for Summary Judgment of Invalidity for the Side-Mount Patents for Anticipation; *LG. Philips LCD Co., Ltd.* v. *Tatung Company of America*, et al., CV 02-6775 CMB (JTLx), U.S. Dist. (C.Cal. 2002), dated Dec. 2, 2005 (15 pgs.).

Under Seal—Statement of Genuine Issues, in Opposition to Defendants' Motion for Summary Judgment of Invalidity for the Side-Mount Patents for Anticipation *LG. Philips LCD Co., Ltd.* v. *Tatung Company of America*, et al., CV 02-6775 CBM (JTLx), U.S. Dist. (C.Cal. 2002), dated Nov. 15, 2005, dated Dec. 2, 2005 (35 pgs.).

Under Seal—Declaration of E. Nair Flores in Support of Motion of Defendants Tatung Co. and Tatung Co. of America for Summary Judgment, or in the Alternative, for Partial Summary Judgment of Invalidity of USP '457 & '237; *LG. Philips LCD Co., Ltd.* v. *Tatung Company of America*, et al., CV 02-6775 CMB (JTLx), U.S. Dist. (C.Cal. 2002), dated Nov. 14, 2005, including Exhs. 1 & (10 pgs.).

Under Seal—Declaration of Mark H. Krietzman in Support of Motion of Defendants Tatung Co. and Tatung Co. of America for Summary Judgment, or in the Alternative, for Partial Summary Judgment of Invalidity of USP '457 & '237; *LG. Philips LCD Co., Ltd.* v. *Tatung Company of America*, et al., CV 02-6775 CMB (JTLx), U.S. Dist. (C.Cal. 2002), including Exhs. A-C & Cert. of Service (90 pgs.).

Under Seal—Deposition of Young-Bum Kim, including Exhs, taken on Apr. 7, 2005 *LG. Philips LCD Co., Ltd.* v. *Tatung Company of America*, et al., CV 02-6775 CBM (JTLx), U.S. Dist. (C.Cal. 2002).

Under Seal—Deposition of Robert Frame, including Exhs; taken Jul. 28, 2005, *LG. Philips LCD Co., Ltd.* v. *Tatung Company of America*, et al., CV 02-6775 CBM (JTLx), U.S. Dist. (C.Cal. 2002).

Under Seal—Deposition of Yong-Un Bang, including Exhs; *LG. Philips LCD Co. Ltd.* v. *Tatung Company of America*, et al., CV 02-6775 CBM (JTLx), U.S. Dist. (C.Cal. 2002), taken Apr. 12, 2005.

Under Seal—Deposition of Michele Bovio taken Oct. 14, 2005; *LG. Philips LCD Co., Ltd.* v. *Tatung Company of America*, et al., CV 02-6775 CBM (JTLx).

Under Seal—Deposition of Michele Bovio, taken Oct 13, 2005; *LG. Philips LCD Co., Ltd.* v. *Tatung Company of America*, et al., CV 02-6775 CBM (JTLx), U.S. Dist. (C.Cal. 2002), CV 02-6775 CBM (JTLx).

Under Seal—Deposition of Michele Bovio; taken Oct. 10, 2005, *LG. Philips LCD Co., Ltd.* v. *Tatung Company of America*, et al., CV 02-6775 CBM (JTLx), U.S. Dist. (C.Cal. 2002).

Under Seal—Reporter's Transcript of Trial Proceedings Defense's Witness, Cross Redirect of G. Lucovsky and videotape of examination of D. Castleberry; *LG. Philips LCD Co., Ltd.* v. *Tatung Company of America*, et al., CV 02-6775 CBM (JTLx), dated Nov. 3, 2006 (pp. 2207-2321).

Under Seal—Memorandum of Contentions of Fact and Law of LG. Philips LCD Co., Ltd. and LG. Electronics Inc.; Motions in Limine, Attached, *LG.Philips LCD Co., Ltd.* v. *Tatung Company of America*, et al., CV 02-6775 CBM (JTLx), U.S. Dist. (C.Cal. 2002); dated Aug. 28, 2006 (116 pgs.).

Under Seal—Defendants Tatung Company's and Tatung Co. of America's Motion in Limine to Preclude Plaintiff LG. Philips LCD Co., Ltd. from Arguing or Introducing Evidence to Suggest that it Invented the Admitted Prior Art Elements; Memorandum of Points and Authorities, *LG. Philips LCD Co., Ltd.* v. *Tatung Company of America*, et al., CV 02-6775 CBM (JTLx), U.S. Dist. (C.Cal. 2002), dated Aug. 28, 2006 (10 pgs.).

Under Seal—Counterclaimant Chunghwa Picture Tubes, Ltd.'s Objections and Responses to Counterclaim Defendant' LG. Philips LCD Co., Ltd.'s Second Set of Interrogatories (Nos. 9-11), including Verification; *LG. Philips LCD Co., Ltd.* v. *Tatung Company of America*, et al., CV 02-6775 CBM (JTLx), U.S. Dist. (C.Cal. 2002), dated Aug. 8, 2005 (27 pgs.).

Under Seal—Chunghwa Picture Tubes, Ltd.'s Supplemental Responses to LG.Philips LCD Co., Ltds.'s First Set of Interrogatories (Nos. 1 & 3); *LG. Philips LCD Co., Ltd.* v. *Tatung Company of America* et al., CV 02-6775 CBM (JTLx), U.S. Dist. (C.Cal. 2002), dated May 10, 2006, including Cert. of Service (134 pgs.).

Under Seal—Chunghwa Picture Tubes, Ltd.'s Supplemental Responses to LG. Philips LCD Co., Ltds.'s First Set of Interrogatories (Nos. 2, 5, 6, 8 & 9); *LG. Philips LCD Co., Ltd.* v. *Tatung Company of America*, et al., CV 02-6775 CBM (JTLx), U.S. Dist. (C.Cal. 2002), dated May 26, 2006, including Cert. of Service (134 pgs.).

Under Seal—Chunghwa Picture Tubes, Ltd.'s Sixth Set of Requests for Production of Documents and Things to LG. Philips LCD Co., Ltd. (Nos. 153-206), *LG. Philips LCD Co., Ltd.* v. *Tatung Company of America*, et al., CV 02-6775 CBM (JTLx), U.S. Dist. (C.Cal. 2002), dated Feb. 16, 2005, including Cert. of Service (18 pgs.).

Under Seal—Chunghwa Picture Tubes, Ltd.'s Objections and Third Supplemental Response to LG. Philips LCD Co. Ltd's First Set of Interrogatories (No. 5), *LG. Philips LCD Co., Ltd.* v. *Tatung Company of America*, et al., CV 02-6775 CBM (JTLx), U.S. Dist. (C.Cal. 2002), dated May 27, 2005, including Cert. of Service (174 pgs.).

Under Seal—Chunghwa Picture Tubes, Ltd.'s Objections and Fourth Supplemental Response to LG. Philips LCD Co. Ltd's First Set of Interrogatories (No. 5),*LG.Philips LCD Co., Ltd.* v. *Tatung Company of America*, et al., CV 02-6775 CBM (JTLx), U.S. Dist. (C.Cal. 2002), dated Aug. 5, 2005, including Cert. of Service (189 pgs.).

Under Seal—Plaintiff Chunghwa Picture Tubes, Ltd.'s First Corrected Supplemental Objections and Responses to Defendant LG. Philips LCD Co. Ltd's First Set of Interrogatories (No. 2-20), *Chunghwa Picture Tubes, Ltd.* v. *LG Electronics Inc.* et al., CV-05-0189 CBM (JTL) dated Jun. 9, 2006 (28 pgs.).

Under Seal—Defendant Viewsonic Corporation's Objections and Responses to LG. Philips LCD Co., Ltd.'s First Set of Interrogatories (Nos. 1-8); *LG. Philips LCD Co., Ltd.* v. *Viewsonic Corp.*; Case No. CV -03-2886 CBM (JTLx); dated Jan. 5, 2004 (19 pgs.).

Under Seal—Defendant Tatung Company of America's First Set of Supplemental Responses to Plaintiff LG. Philips LCD Co., Ltd.'s Interrogatory No. 8; *LG. Philips LCD Co., Ltd.* v. *Tatung Company of America*, et al., CV 02-6775 CBM (JTLx), U.S. Dist. (C.Cal. 2002), dated Nov. 9, 2005 (7 pgs.)

Under Seal—Defendant Tatung Company of America's Second Set of Supplemental Responses to Plaintiff LG. Philips LCD Co., Ltd.'s Interrogatory No. 8; *LG. Philips LCD Co., Ltd.* v. *Tatung Company of America*, et al., CV 02-6775 CBM (JTLx), U.S. Dist. (C.Cal. 2002) dated May 30, 2006 (9 pgs.).

Under Seal—Deposition of D. Grundstrom, *LG. Philips LCD Co., Ltd.* v. *Tatung Company of America*, et al., CV 02-3775 CBM (JTLx), U.S. Dist. (C.Cal. 2002), dated Oct. 28, 2005 (15 pgs.)

Under Seal—Deposition of V. Gupta, *LG. Philips LCD Co., Ltd.* v. *Tatung Company of America*, et al., CV 02-6775 CBM (JTLx), U.S. Dist. (C.Cal. 2002), dated Oct. 26, 2005 (203 pgs.).

Under Seal—Under Seal—Deposition of V. Gupta, *LG. Philips LCD Co., Ltd.* v. *Tatung Company of America*, et al., CV 02-6775 CBM (JTLx), U.S. Dist. (C.Cal. 2002), dated Aug. 7, 2005 (203 pgs.).

Under Seal—Chunghwa Picture Tubes, Ltd.'s Sixth Set of Requests for Production of Documents and Things to LG. Philips LCD Co., Ltd. (Nos. 153-206); *LG. Philips LCD Co., Ltd.* v. *Tatung Company of America*, et al., CV 02-6775 CBM (JTLx), U.S. Dist. (C.Cal. 2002), dated Feb. 16, 2005 (18 pgs.).

Under Seal—LG Electronics Inc.'s Responses to CPT's Second Set of Interrogatories (Nos. 7-11 ); *LG. Philips LCD Co., Ltd.* v. *Tatung Company of America*, et al., CV 02-6775 CBM (JTLx), U.S. Dist. (C.Cal. 2002); dated Apr. 7, 2005, (13 pgs.).

Under Seal—Plaintiff LG. Philips LCD Co., Ltd.'s Supplemental Responses to Defendant Chunghwa Picture Tubes, Ltd.'s First Set of Interrogatories to LG. Philips LCD. Co., Ltd. (Interrogatories Nos. 1-2); *LG. Philips LCD. Co., Ltd.* v. *Tatung Company of America*, et al., CV 02-6775 CBM (JTLx), U.S. Dist. (C.Cal. 2002); dated May 30, 2006, (106 pgs.).

Under Seal—Plaintiff LG. Philips LCD Co., Ltd.'s Supplemental Responses to Defendant Chunghwa Picture Tubes, Ltd.'s Interrogatory Nos. 13-14; *LG.Philips LCD Co., Ltd.* v. *Tatung Company of America*, et al., CV 02-6775 CBM (JTLx), U.S. Dist. (C.Cal. 2002), dated May 30, 2006 (4 pgs.)

Under Seal—Plaintiff LG. Philips LCD Co., Ltd.'s Supplemental Response to Defendant Chunghwa Picture Tubes, Ltd.'s Interrogatory (Nos. 1-3); *LG. Philips LCD Co., Ltd. v. Tatung Company of America*, et al., CV 02-6775 CBM (JTLx), U.S. Dist. (C.Cal. 2002), dated Jun. 23, 2003 (4 pgs.).

Under Seal—Plaintiff LG. Philips LCD Co., Ltd.'s Supplemental Responses to Defendant Chunghwa Picture Tubes, Ltd.'s First Set of Interrogatories (No. 2); *LG. Philips LCD Co., Ltd. v. Tatung Company of America*, et al., CV 02-6775 CBM (JTLx), U.S. Dist. (C.Cal. 2002), dated Jul. 30, 2004(4 pgs.).

Under Seal—LG Electronics' Objections and Responses to Defendant Chunghwa Picture Tube Ltd.'s Third Set of Interrogatories (Nos. 12-24) (Erroneously Captioned as Nos. 12-18); *LG. Philips LCD Co., Ltd. v. Tatung Company of America*, et al., CV 02-6775 CBM (JTLx), U.S. Dist. (C.Cal. 2002); dated Aug. 8, 2005 (13 pgs.).

Under Seal—Plaintiff LG. Philips LCD Co., Ltd's Supplemental Responses to Defendant Chunghwa Picture Tubes, Ltd.'s First Set of Interrogatories (Nos. 2-3); *LG. Philips LCD Co., Ltd. v. Tatung Company of America* et al., CV 02-6775 CBM (JTLx), U.S. Dist. (C.Cal. 2002); dated Aug. 21, 2003 (8 pgs.).

Under Seal—LG. Philips LCD Co., Ltd.'s Objections and Responses to Defendant Chunghwa Picture Tubes, Ltd.'s Seventh Set of Interrogatories (Nos. 21-25) (Erroneously Captioned as Nos. 21-23); *LG. Philips LCD Co., Ltd. v. Tatung Company of America*, et al., CV 02-6775 CBM (JTLx), U.S. Dist. (C.Cal. 2002) dated Sep. 16, 2005 (10 pgs.).

Under Seal—Plaintiff LG. Philips LCD Co., Ltd.'s Responses to Defendant Chunghwa Picture Tubes, Ltd.'s Fifth Set of Interrogatories (Nos. 13-17); *LG. Philips LCD Co., Ltd. v. Tatung Company of America*, et al., CV 02-6775 CMB (JTLx), U.S. Dist. (C.Cal.2002) dated Nov. 17, 2004 (10 pgs.).

Under Seal—Plaintiff LG. Philips LCD Co., Ltd.'s Supplemental Responses to Defendant Chunghwa Picture Tubes, Ltd.'s Interrogatories Nos. 13-14 and 17); *LG. Philips LCD Co., Ltd. v. Tatung Company of America*, et al., CV 02-6775 CBM (JTLx), U.S. Dist. (C.Cal. 2002) dated Mar. 7, 2005 (7 pgs.).

Under Seal—LG. Philips LCD Co., Ltd.'s Supplemental Responses to CPT's First Set of Interrogatories Nos. 1, 2 3 and 4); *LG. Philips LCD Co., Ltd. v. Tatung Company of America*, et al., CV 02-6775 CBM (JTLx), U.S. Dist. (C.Cal. 2002); Oct. 20, 2003, CV 02-675 CBM (JTLx) (43 pgs.).

Under Seal—Order Re Claim Construction, *LG. Philips LCD Co., Ltd. v. Tatung Company of America*, et al., CV 02-6775 CBM (JTLx), U.S. Dist. (C.Cal. 2002); dated May 5, 2005 (19 pgs.).

Under Seal—Table comparing elements of '139 & '457 patents to JP 1-237591, JP U 1-59223, JP U3-6670, JP 7-99394 (9 pgs.).

Under Seal—Table comparing elements of '537 patents to JP 05-42853, JP Pubin. 7-99394, JP 04-56822 (6 pgs.).

Under Seal—Letter to David Makman, Esq. from Tom Simotas, re: 50 133 T 00379 04; *Chunghwa Picture Tubes, Ltd. ("CPT") v. LG Electronics Inc.* et al., Jun. 20, 2006 (22 pgs.).

Under Seal—Assignment Agreement between Hewlett-Packard Development Co, LP and Chunghwa Picture Tubes, Ltd. dated Feb. 10, 2004 (17 pgs.).

"Nikkei Microdevice Special Issue Flat Panel Display 1997", Dec. 12, 1996 at p. 49.

*LG.Philips LCD Co., Ltd., Plaintiff v. Tatung Co., of America Tatung Company, & Chunghwa Picture Tubes, Ltd.*; Defendant Tatung Co. of America's Responses to Plaintiff LG.Philips LCD Co., Ltd.'s Second Set of Interrogatories; dated Dec. 31, 2003; Cert. of Service; 12 pgs.

*LG. Philips LCD Co., Ltd, Plaintiff v. Tatung Co., of America*; Defendant Tatung Co. of America's Second Set of Supplemental Responses to Plaintiff LG. Philips LDC Co., Ltd.'s Interrogatory No. 8; dated: May 30, 2006; Cert. of Service; 8 pgs.)

*LG. Philips LCD Co., Ltd., Plaintiff v. Tatung Co. of America*; Defendant Tatung Company's Responses to Plaintiff LG. Phillips LCD Co., Ltd's Second Set of Interrogatories (Nos. 6-12); dated: Dec. 31, 2003; Cert of Service; 13 pgs.

*LG. Philips LCD Co., Ltd., Plaintiff v. Tatung Co. of America*; Counterclaimant Chunghwa Picture Tubes, Ltd.'s Objections and Responses to Counterclaims Defendant LG. Philips LCD Co., Ltd.'s Second Set of Interrogatories (Nos. 9-11); dated: Aug. 8, 2005; Cert. of Service; 27 pgs.

*LG. Philips LCD Co., Ltd., Plaintiff v. Tatung Co. of America*; Defendant Tatung Co. of America's First Set of Supplemental Responses to Plaintiff LG. Philips LCD Co., Ltd.'s Interrogatory No. 8; dated Nov. 8, 2005; Cert of Service; 6 pgs.

*LG. Philips LCD Co., Ltd., Plaintiff v. Tatung Co. of America*; Counterclaimant Chunghwa Picture Tubes, Ltd.'s Objections and Supplemental Responses to Counterclaim Defendant LG. Philips LCD Co., Ltd.'s Second Set of Interrogatories (No. 9); dated May 10, 2006; Cert of Service; 12 pgs.

*LG. Philips LCD Co., Ltd., Plaintiff v. Tatung Co. of America*; Counterclaimant Chunghwa Picture Tubes, Ltd.'s Objections and Supplemental Responses to Counterclaim Defendant LG. Philips LCD Co., Ltd.'s Second Set of Interrogatories (Nos. 10-11); dated May 25, 2006; Cert of Service; 26 pgs.

*LG. Philips LCD Co., Ltd., Plaintiff v. Tatung Co. of America*; Counterclaimant Chunghwa Picture Tubes, Ltd.'s Supplemental Responses to Counterclaim Defendant LG. Philips LCD Co., Ltd.'s Second Set of Interrogatories (Nos. 1-5 and 8); dated May 25, 2006; Cert of Service; 13 pgs.

*LG. Philips LCD Co., Ltd., Plaintiff v. Tatung Co. of America*; Counterclaimant Chunghwa Picture Tubes, Ltd.'s Objections and Responses to Counterclaim Defendant LG. Philips LCD Co., Ltd.'s Second Set of Interrogatories (Nos. 9-11); dated Aug. 8, 2005; Cert of Service, 27 pgs.

*LG. Philips LCD Co., Ltd., Plaintiff v. Tatung Co. of America*; Counterclaimant Chunghwa Picture Tubes, Ltd.'s Objections and Supplemental Responses to Counterclaim Defendant LG. Philips LCD Co., Ltd.'s Second Set of Interrogatories (No. 9); dated May 10, 2006; Cert of Service; 12 pgs.

*LG. Philips LCD Co., Ltd., Plaintiff v. Tatung Co. of America*; Counterclaimant Chunghwa Picture Tubes, Ltd.'s Supplemental Responses to Counterclaim Defendant LG. Philips LCD Co., Ltd.'s Second Set of Interrogatories (Nos. 10-11); dated May 25, 2006; Cert of Service; 24 pgs.

*LG. Philips LCD Co., Ltd., Plaintiff v. Tatung Co. of America*; Chunghwa Picture Tubes, Ltd's Objections and Third Supplemental Response LG. Philips LCD Co., Ltd.'s First Set of Interrogatories (No. 5); dated May 27, 2005; 192 pgs.

*LG. Philips LCD Co., Ltd., Plaintiff v. Tatung Co. of America*; Chunghwa Picture Tubes, Ltd.'s Objections and Supplemental Responses to Counterclaim Defendant LG. Philips LCD Co., Ltd's First Set of Interrogatories (Nos. 4-6); dated Jul. 23, 2004; Cert of Service; 17 pgs.

*LG. Philips LCD Co., Ltd., Plaintiff v. Tatung Co. of America*; Chunghwa Picture Tubes, Ltd.'s Objections and Supplemental Responses to LG. Philips LCD Co., Ltd.'s First Set of Interrogatories (Nos. 4, 5, and 10); dated Sep. 30, 2003; 82 pgs.

*LG. Philips LCD Co., Ltd., Plaintiff v. Tatung Co. of America*, et al; Order Denying LG. Philips Motion to Dismiss Counts I-VIII andf XXIII-XXIV and Denying LG. Electronics' Motion to Dismiss Counts I-X and XXIII-XXIV of Chunghwa Picture Tubes First Amended Counterclaims: dated Feb. 4, 2008; 12 pgs.

*LG. Philips LCD Co., Ltd., Plaintiff v. Tatung Co. of America*, et al; Declaration of Young Un Bang in Support of Opposition to Chunghwa Picture Tubes, Ltd.'s Motion for Summary Judgment on Plaintiffs Side-Mount Patent Infringement Clams for Lack of Standing; dated Jul. 20, 2004; 11 pgs.

*LG. Philips LCD Co., Ltd., Plaintiff v. Tatung Co. of America* et al; Declaration of Young Bum Kim in Support of Opposition to Chunghwa Picture Tubes, Ltd.'s Motion for Summary Judgment on Plaintiff Side-Mount Patent Infringement Claims for Lack of Standing; dated Jul. 20, 2004; 9 pgs.

Assignment PTO 1595 Form dated and filed Jul. 7, 2003; 3 pgs.

*LG. Philips LCD Co., Ltd., Plaintiff v. Tatung Co. of America* et al; Chunghwa Picture Tubes, Ltd.'s Memorandum of Points and Authorities in Support of Motion for Leave to Amend Answers and Counterclaims and to Join LG Electronics, Inc. as a Party; dated Jun. 21, 2004; 19 pgs.

*LG. Philips LCD Co., Ltd., Plaintiff v. Tatung Co. of America* et al; Order Granting in Part Chunghwa Picture Tubes, Ltd.'s Motion for Leave to Amend Answer and Counterclaims and to Join LG Electronics, Inc. as a Party; dated Aug. 31, 2004; 17 pgs.
Corbin, Teresa, Roth, Anthony, and Simotas, Simon; Correspondences Re: 50 T 133 00379 04, *Chunghwa Picture Tubes, Ltd. (CPT) v. LG Electronics Inc. and LG Philips LCD Co., Ltd* (LG Parties); Jan. 3, 2005 & Mar. 10, 2005; 9 pgs.
*LG. Philips LCD Co., Ltd., Plaintiff v. Tatung Co. of America*, et al; Plaintiff LG. Philips LCD Co., Ltd.'s Supplemental Response to Defendant Chunghwa Picture Tubes, Ltd.'s First Set of Interrogatories (Nos. 2-3); dated Aug. 22, 2003; Cert of Service; 8 pgs.
*LG. Philips LCD Co., Ltd., Plaintiff v, Tatung Co. of America*, et al; LG. Philips LCD Co., Ltd.'s Supplemental Interrogatory Responses to CPT's First Set of Interrogatories to LG. Philips LCD Co., Ltd. (Interrogatory Nos. 1-4); dated Oct. 20, 2003; Cert of Service; 40 pgs.
*LG. Philips LCD Co., Ltd., Plaintiff v. Tatung Co. of America*, et al; Plaintiff LG. Philips LCD Co., Ltd 's Supplemental Response to Defendant Chunghwa Picture Tubes, Ltd.'s First Set of Interrogatories (No. 2); dated Jul. 30, 2004; Cert of Service; 8 pgs.
*LG. Philips LCD Co., Ltd., Plaintiff v. Tatung Co. of America*; Plaintiff LG. Philips LCD Co., Inc.'s Supplemental Responses to Defendant Chunghwa Picture Tube Ltd.'s First and Third Sets of Interrogatories (Interrogatory Nos. 2 and 3); dated Apr. 1, 2005; Cert of Service; 11 pgs.
*LG. Philips LCD Co., Ltd., Plaintiff v. Tatung Co. of America*; Declaration of Dug Hyun Hwang in Support of Opposition to Chunghwa Picture Tubes, Ltd.'s Motion for Summary Judgments on Plaintiffs Side-Mount Patent Infringement Claims for Lack of Standing; dated Jul. 21, 2004; 5 pgs.
Correspondences: Mathews, Chris; and Roth, Anthony; Re: *LG. Philips LCD Co., Ltd. v. Tatung Co. of America*, et al; dated Mar. 4, 9, and 10, 2004; 30 pgs.
*LG. Philips LCD Co., Ltd., Plaintiff v. Tatung Co., of America*, et al; Second Supplemental Expert Report of Dr. Vijay Gupta Re: U.S. Patents No. 5,926,237; 6,002,457; 6,020,942 and 6,373,537; dated Dec. 16, 2005; 16 pgs.
*LG. Philips LCD Co., Ltd., Plaintiff v. Tatung Co., of America*, et al; Expert Report of Dr. Vijay Gupta Re: U.S. Patents No. 5,926,237; 6,002,457; 6,020,942 and 6,373,537; dated Dec. 23, 2005; Cert of Service; 76 pgs.
*LG. Philips LCD Co., Ltd., Plaintiff v. Tatung Co., of America*, et al; Statement of Genuine Issues in Opposition to Defendants' Motions for Summary Judgment of invalidity for the Side-Mount Patents for Anticipation; dated Jan. 9, 2006; 35 pgs.
*LG. Philips LCD Co., Ltd., Plaintiff v. Tatung Co., of America*, et al; Supplemental Expert Report of Dr. Vijay Gupta Re: U.S. Patents No. 5,926,237; 6,002,457; 6,020,942 and 6,373,537; dated Nov. 9, 2005; 74 pgs.
*LG. Philips LCD Co., Ltd., Plaintiff v. Tatung Co., of America*, et al; Expert Report of Gerstman, George H.; Un-Dated; 29 pgs.
*LG. Philips LCD Co., Ltd., Plaintiff v. Tatung Co., of America*, et al; Expert Report of Smith-Gillespie, Robert in Rebuttal to Expert Report of Dr. Vijay Gupta; dated Oct. 14, 2005; 13 pgs.
Appln for McCartney, Richard, et al; The Primary Flight Instruments for the Boeing 777 Airplane; SPIE Vo. 2219 Cockpit Display; 1994; 13 pgs.
Appln for Smith-Gillespie, Robert D., et al; 777 LCD Backlight Life; SPIE Vo. 2219 Cockpit Display; 1994; 9 pgs.
LG Side Mounting History; Case No. CV 02-6775 CBM; *LG. Philips LCD Co., Ltd. v. Tatung Co. of America*, et al; Defendants Exhibit No. 3573; 2 pgs.
Rebuttal Witness Statement of Bang, Young Un; Aug. 19, 2005; 11 pgs.
Rebuttal Witness Statement of Hwang, Dug Hyun; Aug. 19, 2005; 4 pgs.
Rebuttal Witness Statement of Cho, Gi Ho; Aug. 19, 2005; 7 pgs.
Rebuttal Witness Statement of Lee, Sang Hoon; Jul. 28, 2005; 14 pgs.
Rebuttal Witness Statement of Lee, Dong Sun; Jul. 28, 2005; 23 pgs.
Rebuttal Witness Statement of Choi, Jin Kwan; Jul. 29, 2005; 8 pgs.
Rebuttal Witness Statement of Kim, Yong Bum; Jul. 28, 2005; 10 pgs.
Reference No. CPT 267696; Patent Appln No. 1997-135610; Dec. 1996; Abstract Only.
Kawamoto, Masahiro, et al; Color-Liquid-Crystal Display for Automotive Instrument Panel (English Trnsltn included); 14 pgs.

*LG. Philips LCD Co., Ltd., Plaintiff v. Tatung Co., of America*, et al; Declaration of FRAME, Robert C.; dated Feb. 24, 2004; 14 pgs.
*LG. Philips LCD Co., Ltd., Plaintiff v. Tatung Co., of America*, et al; Declaration of BOVIO, Michele B.; dated Feb. 28, 2004; 9 pgs.
Prosecution History of European Patent No. 0880049; 184 pgs.
*LG. Philips LCD Co., Ltd., Plaintiff v. Tatung Co., of America*, et al; Rebuttal Expert report of Samuel R. Phillips on U.S. Patent Nos. 5,926,237; 6,002,457; 6,020,942 and 6,373,537; dated Oct. 13, 2005; 113 pgs.
*LG. Philips LCD Co., Ltd., Plaintiff v. Tatung Co., of America*, et al; Expert report of Dr. Vijay Gupta Re: U.S. Patent Nos. 5,926,237; 6,002,457; 6,020,942 and 6,373,537; dated Sept. 23, 2005.
Prosecution History of European Patent No. 297 12775; 53 pgs.
Prosecution History of European Patent No. 297 21 272.9; 45 pgs.
Prosecution History of European Patent No. 2 319 110; 124 pgs.
Prosecution History of European Patent No. 2 761 798; 22 pgs.
Prosecution History of European Patent No. 197 3 006; 44 pgs.
Prosecution History of Singapore Patent No. 9800814-7; 52 pgs.
Prosecution History of European Patent No. 0 880 049; 53 pgs.
Prosecution History of European Patent No. 00115576; 32 pgs.
*LG. Philips LCD Co., Ltd., Plaintiff v. Tatung Co., of America*, et al; LG. Philips LCD Co., Ltd's Opening Claim Construction Brief; dated Feb. 6, 2003; Cert of Service; 64 pgs.
*LG. Philips LCD Co., Ltd., Plaintiff v. Tatung Co., of America*, et al; Second Revised Joint Claim Construction Statement; dated Dec. 23, 2003; 10 pgs.
*LG. Philips LCD Co., Ltd., Plaintiff v. Tatung Co., of America*, et al; Order Re: Claim Construction; dated May 5, 2005; 19 pgs.
*LG. Philips LCD Co., Ltd., Plaintiff v. Tatung Co., of America*, et al; Defendants' Opening Brief in Support of Their Proposed Claims Constructions; dated Feb. 6, 2004; 67 pgs.
*LG. Philips LCD Co., Ltd., Plaintiff v. Tatung Co., of America*, et al; LG Philips Co., Ltd's Exhibits to the *Second Revised* Joint Claim Construction Statement Re: Side-Mount Patents-in-Suit; dated Dec. 23, Cert. of Service; 12 pgs.
*LG. Philips LCD Co., Ltd., Plaintiff v. Tatung Co., of America*, et al; Reporter's Daily Transcript; dated Oct. 16, 2005; 5 pgs.
*LG. Philips LCD Co., Ltd., Plaintiff v. Tatung Co., of America*, et al; Amended Order Dismissing Plaintiff's Side-Mount Patent Infringement Claims for Lack of Standing; dated Jan. 19, 2007; 11 pgs.
*LG. Philips LCD Co., Ltd., Plaintiff v. Tatung Co., of America*, et al; LG. Philips Co. Ltd' Responsive Claim Constructive Brief; dated Feb. 27, 2004; 56 pgs.
*LG. Philips LCD Co., Ltd., Plaintiff v. Tatung Co., of America*, et al; Defendants' Supplemental Exhibits to Exhibit B of the *Second Revised* Joint Claim Construction; dated Dec. 23, 2003; Cert. of Service; 125 pgs.
English language translation dated Apr. 9, 1999 of attachment to Japanese Patent Appln. H09-135610, (17 pgs.)
LCD Business Headquarter Patent Management Part; History of LG Side Mounting Patent Invention; MLA 005099; 1 pg.
Mead Spell-Write Steno Book; LPL Ref No. 020717 w/Appendix A-C.
Correspondence: Foster, Mark Re: Project X Status; LPL Ref No. 021059; dated Feb. 14, 1996; 2 pgs.
Foreign Correspondence w/Translation; Hwang, Un-Kwang; Report on the Tokyo Meeting of Company Q; dated Mar. 28, 1996 6 pgs.
Foreign Correspondence w/Translation; Report on Meeting with Company Q; LPL Ref Nos. 021136-021140; dated Feb. 22, 1996; 10 pgs.
Foreign Correspondence w/Translation; Comments on Request of 13.3" XGA Review (including request 14.1" development review); LPL Ref No. 22423; Aug. 13, 1996; 2 pgs.
Foreign Correspondence w/Translation; Report on Meeting with Company Q; LPL Refs Nos. 019632-019634; dated Feb. 29, 1996; 6 pgs.
Foreign Correspondence w/Translation; Report on Tool-Related Meeting with Company Q; LPL Refs Nos. 019635-019644; dated Feb. 27, 1996; 6 pgs.
Foreign Correspondence w/Translation; Report on Meeting with Company Q; LPL Refs Nos. 019645-019647; dated Feb. 11, 1996; 6 pgs.

Facsimile Correspondence; Foster, Mark; Re: Project X Status; LPL Refs Nos. 019665-019667; dated Feb. 14, 1996; 3 pgs.

English Translated Travel Itinerary Re: Mar. 26 Business Trip to Tokyo; LPL Refs Nos. 019845-019846; 2 pgs.

English Translated Meeting Slides; Executive Meeting with Digital Re: Project X; LPL Ref Nos. 019847-019856, dated Mar. 26, 1996; 20 pgs.

English Translated Memo; Kim, Sung Kyu; Report on Business Trip to Company Q; LPL Ref Nos. 019883-019885; Mar. 11, 1996; 6 pgs.

Facsimile Correspondence w/Translation; Re: Business Trip Interim Report; LPL Ref Nos. 019894-019898; dated Mar. 6, 1996; 9 pgs.

English Translated of Mar. 8, 1996 Discussion Report; LPL Ref Nos. 019899-019903; dated Mar. 12, 1996; 14 pgs.

English Translated Inquiry on Content of Document dated May 9, 1996 Cho, Ki Ho; LPL Ref Nos. 020007-020008; dated May 7, 1996; 4 pgs.

Mai, Mike; Email Correspondence Re: Project X Executive Review Meeting Minute; LPL Ref Nos. 020018-020020; Jun. 4, 1996; 3 pgs.

Lee, Dave; Letter to Bovio Re: An Update to 14.1: XGA Display for Project X; LPL Ref Nos. 019505-019507.

English Translation; Re: Minutes of Q Company's Tokyo Meeting dated Mar. 28, 1996—Resent; LPL Ref No. 0195112-019513; 6 pgs.

English Translation; Re: Q's Visit / Minutes; LPL Ref Nos. 019520-019522; dated Mar. 30, 1996; 6 pgs.

Translated Facsimile; Report of the Meeting with Q; LPL Ref Nos. 019523-019526; dated Feb. 22, 1996.

Lee, Soo Gwan; Translated Memo Re: Consulting with Q; LPL Ref Nos.019527-019530; dated Feb. 22, 1996; 8 pgs.

English Translated Document Re: Comments on Requesting to Review 13.3" XGA (Request of Review on 14.1" XGA Development Included); LPL Ref No. 019630; Feb. 15, 1996; 2 pgs.

Wood, "Honeywell militarized color liquid crystal displays for the F-16," Honeywell Defense Avionics Systems, SPIE vol. 2734, pp. 108-118.

Syroid et al., "A High Performance 4×4 inch AMLCD for Avionic Applications," SPIE vol. 2734, pp. 240-247.

IBM Technical Disclosure Bulletin, vol. 33, No. 9, Feb. 1991 entitled "High Efficiency Back Ligh for LCD".

IBM Technical Disclosure Bulletin, vol. 37, No. 12, Dec. 1994 entitled "Cell Support Assembly Without Screw".

IBM Technical Disclosure Bulletin, vol. 39, No. 1, Jan. 1996 entitled "Structure Design for Liquid Crystal Display Module".

Advanced Display Inc., "14.2 XGA (Ver. 2) Technical Data, AA 142XB11".

IBM Technical Disclosure Bulletin, "Cell Support Assembly without Screw"; Dec. 1994, vol. 37, No. 12, p. 33.

IBM Technical Disclosure Bulletin, "Structure Design for Liquid Crystal Display Module", Jan. 1996, vol. 39 No. 01, pp. 71-73.

"Flat-Panel Display", 1997, pp. 49.

European Search Report Dated Jan. 15, 2001.

US 7,944,522 B2

COMPUTER HAVING LIQUID CRYSTAL DISPLAY

This application is a continuation of U.S. patent application Ser. No. 10/068,847 filed on Feb. 11, 2002, which is a continuation of U.S. patent application Ser. No. 09/326,540 filed on Jun. 7, 1999 now U.S. Pat. No. 6,373,537, which is a continuation of U.S. patent application Ser. No. 09/145,357 filed on Sep. 1, 1998 now U.S. Pat. No. 5,926,237, which is a continuation of U.S. patent application Ser. No. 08/888,164 filed on Jul. 3, 1997 now U.S. Pat. No. 5,835,139, which claims the benefit of Korean Application No. 12899/1997 filed on Apr. 8, 1997, and Korean Application No. 14278/1997 filed on Apr. 17, 1997, which are hereby incorporated by reference for all purposes as if fully set forth herein.

BACKGROUND OF THE INVENTION

1. Field of the Invention

The present invention relates to a computer, and more particularly, to a display unit of a portable computer.

2. Discussion of the Related Art

In general, a liquid crystal display (LCD) device used for a computer such as a portable computer or for a portable display is shown in FIG. 1. Referring to FIG. 1, the LCD device includes a liquid crystal panel 20, a back light unit, and a driving circuit board 23. The back light unit is comprised of a luminescent lamp 11, a lamp housing 12 having a U-shape and surrounding the lamp 11, a light guide 13, a reflector 14 reflecting the incident light from the horizontal direction to the vertical direction, a protection sheet 15 contacting the light guide 13, a first prism sheet 16 and a second prism sheet 17 set on the protecting sheet 15 and condensing the incident light from the light guide 13 to some direction, a diffuser 18 diffusing the light from the first and second prisms 16 and 17 to a viewing area 21 of the liquid crystal panel 20 with a certain viewing angle, and a first support frame 19 supporting these elements.

FIG. 3 shows a cross-sectional view of the light-guiding plate showing a gradual thickness decrease in cross-section as it extends away from the light source 11. A fluorescent lamp 11 as the light source is fixed at a thicker end of the light-guiding plate 13. When the fluorescent lamp 11 is turned on, the light 23 from the source 11 is reflected by the lamp housing 12 surrounding the fluorescent lamp 11. The reflected light transmits through the cross-section towards the other side (thinner end) of the light-guiding plate 13 as indicated by the arrows. Then, the light spreads all over the surface of the light-guiding plate 13 and reaches the display area 21 (FIG. 1) through the diffusion plate 18. At the same time, a thin film transistor formed on the liquid crystal panel controls a corresponding pixel according to the signals from the driving circuit 30 (FIG. 1) to selectively transmit the light which collectively realizes the display of images on the display area.

The liquid crystal display is usually combined with, for example, a notebook computer as an output screen. The following method is used to fix the liquid crystal display to a device such as a notebook computer.

Referring to FIGS. 3a and 3b, in a conventional liquid crystal display, a ground supporting plate 30 is disposed on the first fastening frame 19. A mounting hole 33 is formed through the ground supporting plate 30 and the first fastening frame 19, as shown in FIG. 3b. Then, the ground supporting plate 30 and the first fastening frame 19 are fixed by a screw 31 as shown in FIG. 3a. In other words, a liquid crystal display is fixed to a device such as a notebook computer so as to fasten the first fastening frame 19 and the ground supporting plate 30 by a fastening element such as a screw.

However, the liquid crystal display becomes thicker due to the length of the screw according to the method as shown in FIGS. 3a and 3b. Moreover, since the mounting hole 33 for the screw is formed on the front surface of the liquid crystal display, the display area of the liquid crystal display becomes narrow.

According to the structure described above, the LCD device operates as follows. The light from the luminescent lamp 11 is incident on the rear surface of the liquid crystal panel 20 through the back light unit. A control circuit placed on the driving circuit board 30 controls the incident light on the viewing area 21 of the liquid crystal panel 20 to display images and characters.

FIG. 4 is a drawing showing a plan view of the final assembly structure of the conventional liquid crystal display device. FIG. 4 also shows the assembled result of a second support frame 40, liquid crystal panel 20 and back light unit having an assembly structure for mounting to a portable computer. The second support frame 40 is made of metal or plastic, and holds the liquid crystal panel 20 and the back light unit. Here, the driving circuit board 23 is located behind the rear part of the back light unit connected to the liquid crystal panel 20 with a flexible film (not shown).

FIG. 5 shows the assembly structure of the liquid crystal panel 20 and body 60 of the portable computer in the conventional method. The second support frame 40 is mounted to a rear case 50 of the portable computer using screws 43 through screw holes 41. A front case (not shown) having a blank area adjusted to the viewing area is joined at the rear case 50. That is, the liquid crystal panel 20 is mounted with the rear case 50 by the screws 43 locked in the normal direction of the display surface through the screw holes 41 formed on that surface. Although not shown in the drawings, the front case is mounted on the LCD device, opening the viewing area 21 and covering the other parts.

In general, as the size of the portable computer is designed for easy movement, the same goes for an A4 copy sheet, for example. Therefore, the ratio of the viewing area to the whole surface area of the display and the thickness of the display device affect the quality of the portable computer. However, in a conventional portable computer, screw holes 41 are located on edge portions of the display surface in order to join the second support frame 40 to the rear case 50. As the display area has a screw frame area 42 (FIG. 4) for forming the holes 41, the ratio of the area of the LC panel to the viewing area 21 is reduced.

Furthermore, in the conventional portable computer, as the screws 43 are locked to the liquid crystal display device and the rear case 50 in the normal direction of the display surface, the display part is thick enough to form an assembly device 51 for the screws 43, such as screw holes 41. The second support frame 40 is also large enough to have a space for supporting the screw holes 41. Thus, it is difficult to reduce the weight of the portable computer.

Accordingly, a liquid crystal device is needed having a high viewing ratio of the display, low weight, and reduced thickness for a computer, such as a portable computer.

SUMMARY OF THE INVENTION

Accordingly, the present invention is directed to a computer that substantially obviates one or more of the problems due to limitations and disadvantages of the related art.

An object of the present invention is to increase the ratio of the viewing area to the whole area of a computer display.

Another object of the present invention is to provide a thin, light weight display unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a liquid crystal panel including a display area; a light source joined with the liquid crystal panel; a first frame coupled to a surface of the light unit and sides of the liquid crystal panel; a second frame coupled to edges of the liquid crystal panel and sides of the first support frame; an outer casing; and a fastening part joining together the first support frame, the second support frame, and the outer casing through the sides of the first support frame, the second support frame, and the outer casing.

In another aspect of the present invention, a portable computer comprises a liquid crystal display device having a display surface and a first plurality of side surfaces; a body having an input device; a cover, coupled to an edge of the body, having a second plurality of side surfaces; and a fastening unit attaching the first plurality of side surfaces of the liquid crystal display device to the second plurality of side surfaces of the cover, the liquid crystal display device being mounted to the cover.

In another aspect of the present invention, a portable computer comprises a liquid crystal display device having a first side surface; a body having an input device; a cover joined with the body and having a second side surface; and a fastening unit joining together the liquid crystal display device and the cover through the first and second side surfaces of the liquid crystal display device and the cover, respectively.

In a further aspect of the present invention a liquid crystal display device comprises a first support frame having a first fastening member at a side surface of the first support frame; a reflector unit adjacent the first support frame; a light source adjacent to the reflector unit; a light guide unit adjacent the reflector unit; a protection unit adjacent the light guide unit; a prism unit adjacent the protection unit; a diffuser unit adjacent the prism unit; a liquid crystal panel adjacent the diffuser unit; and a second support frame having a second fastening member at a side surface of the second support frame, wherein the reflector unit, the protection unit, the prism unit, and the diffuser unit, the liquid crystal panel are between the first and second support frame, and the first and second support frame are attached to each other through the first and second fastening members through the side surfaces of the first and second support frames.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
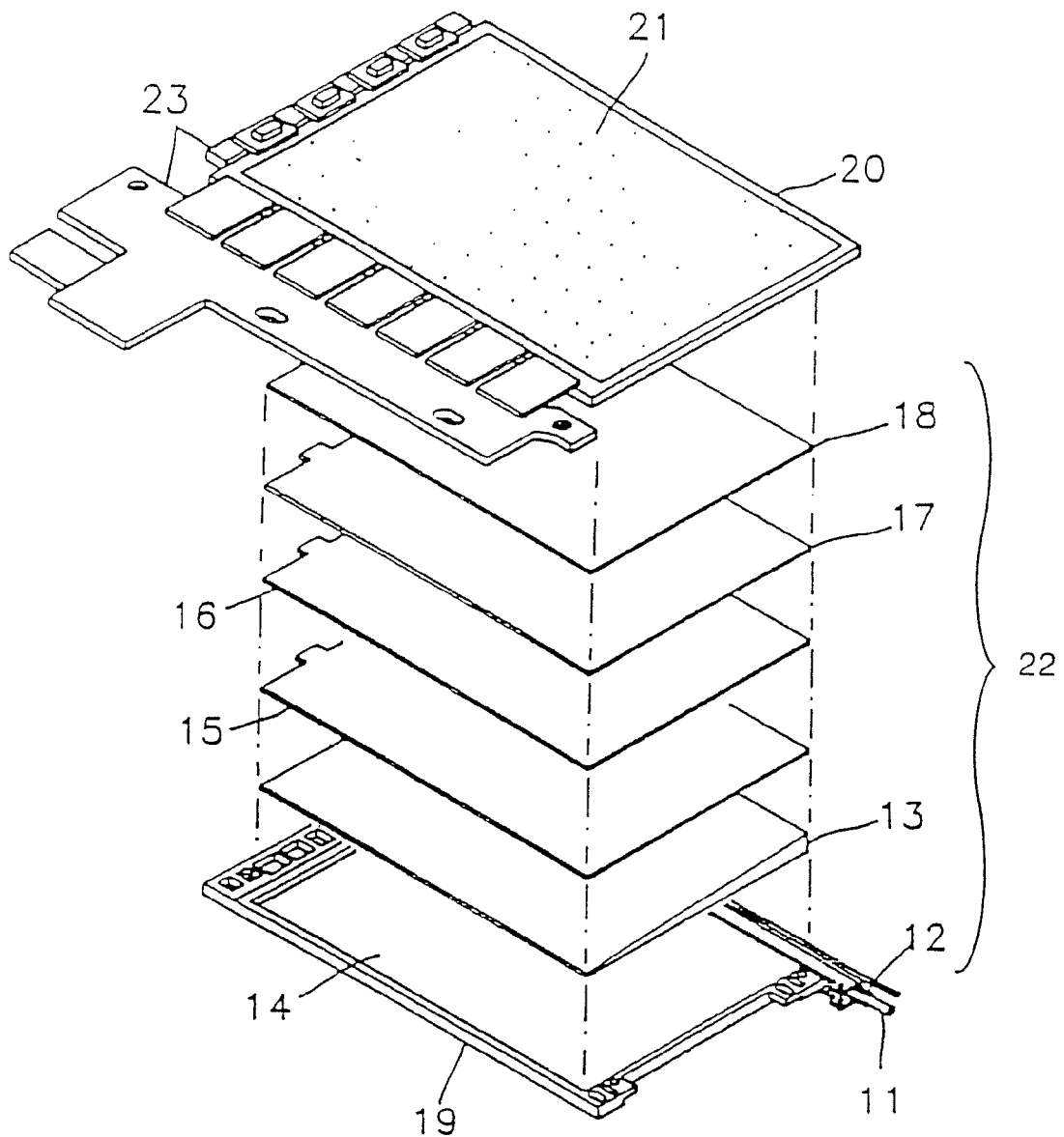
FIG. 1 is a perspective drawing showing the structure of the conventional liquid crystal display device.
Figure 2:
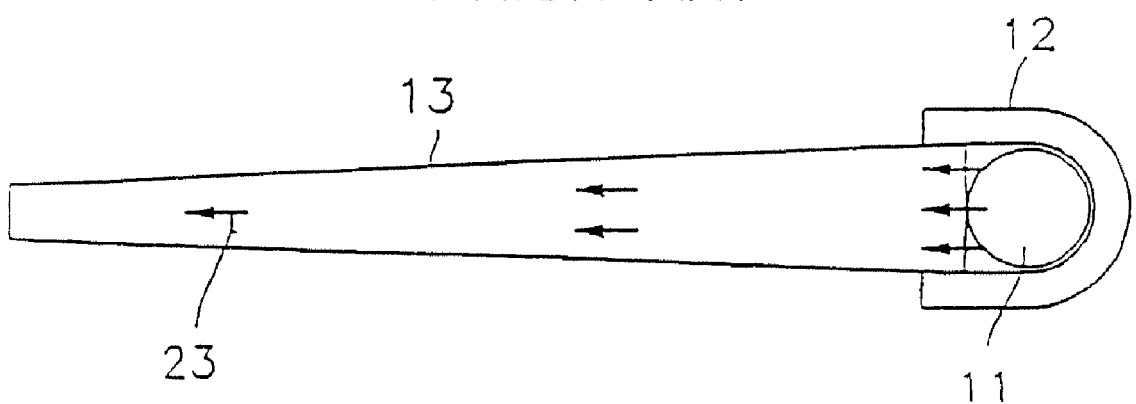
FIG. 2 is a cross-sectional view of a light-guiding plate and a fluorescent lamp.
Figure 3A:
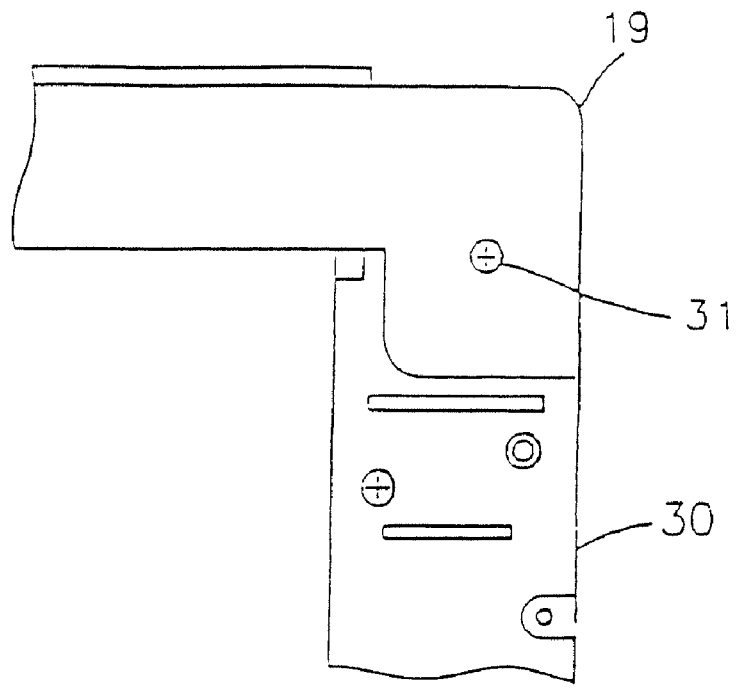
FIG. 3a is a plan view of a liquid crystal display showing a screw frame of a first fastening frame.
Figure 3B:
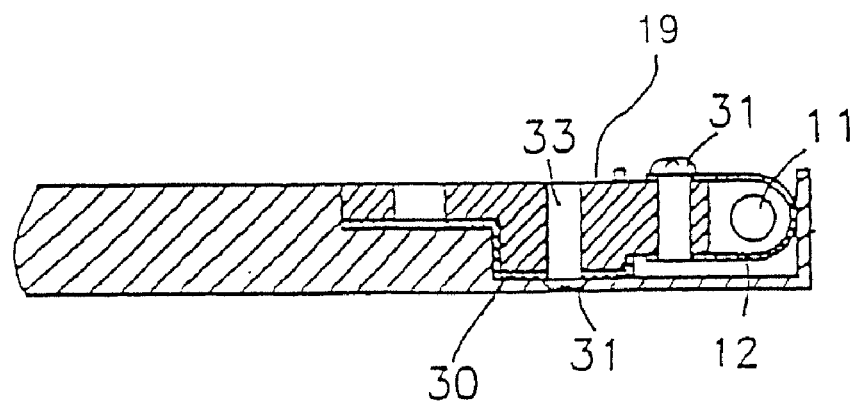
FIG. 3b is a cross-sectional view of a liquid crystal display illustrating a first fastening frame, a lamp housing, and ground support plates fixed together by a screw.
Figure 4:
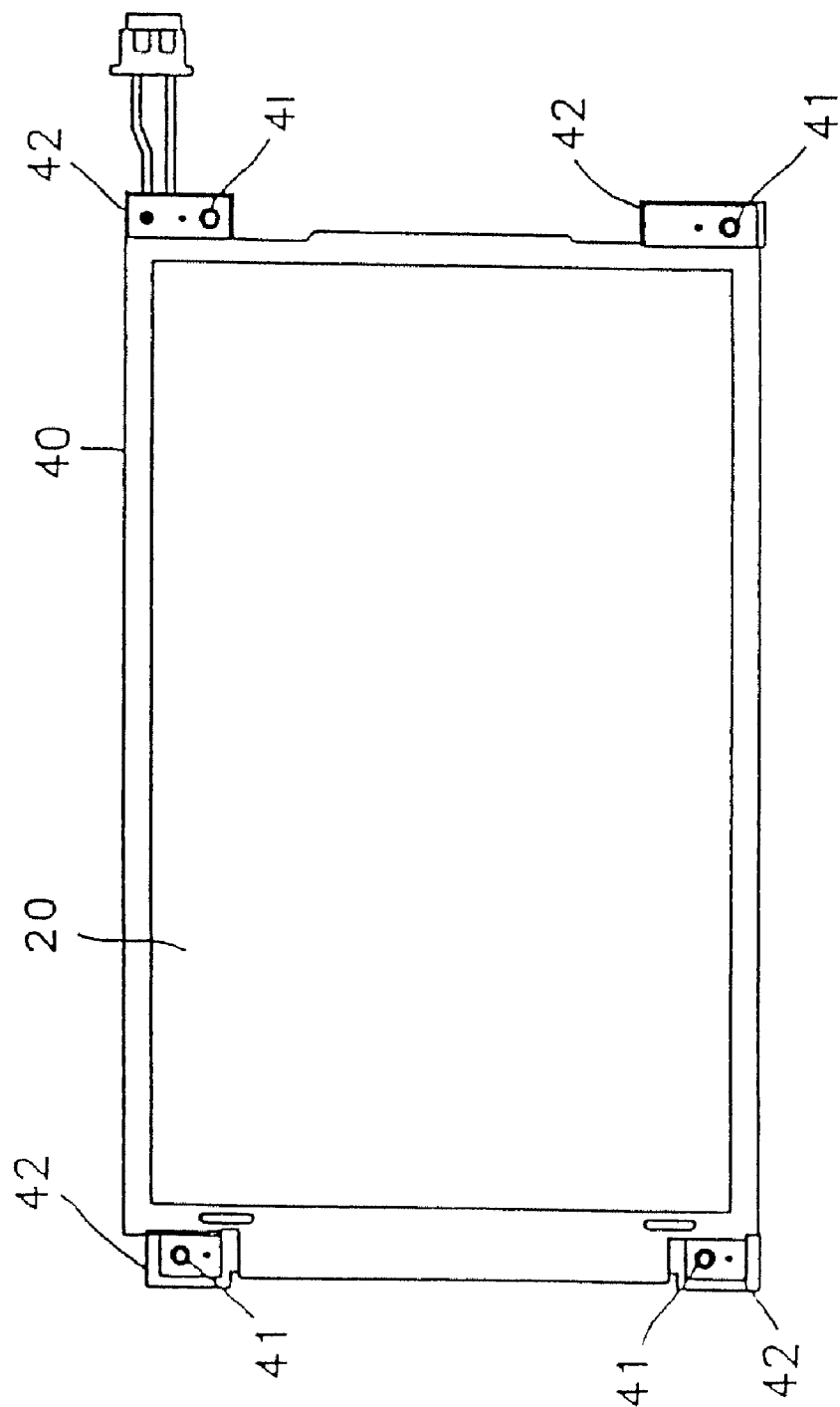
FIG. 4 shows a plan view of the final assembly structure of the liquid crystal panel, support frame, and back light unit in the conventional liquid crystal display device.
Figure 5:
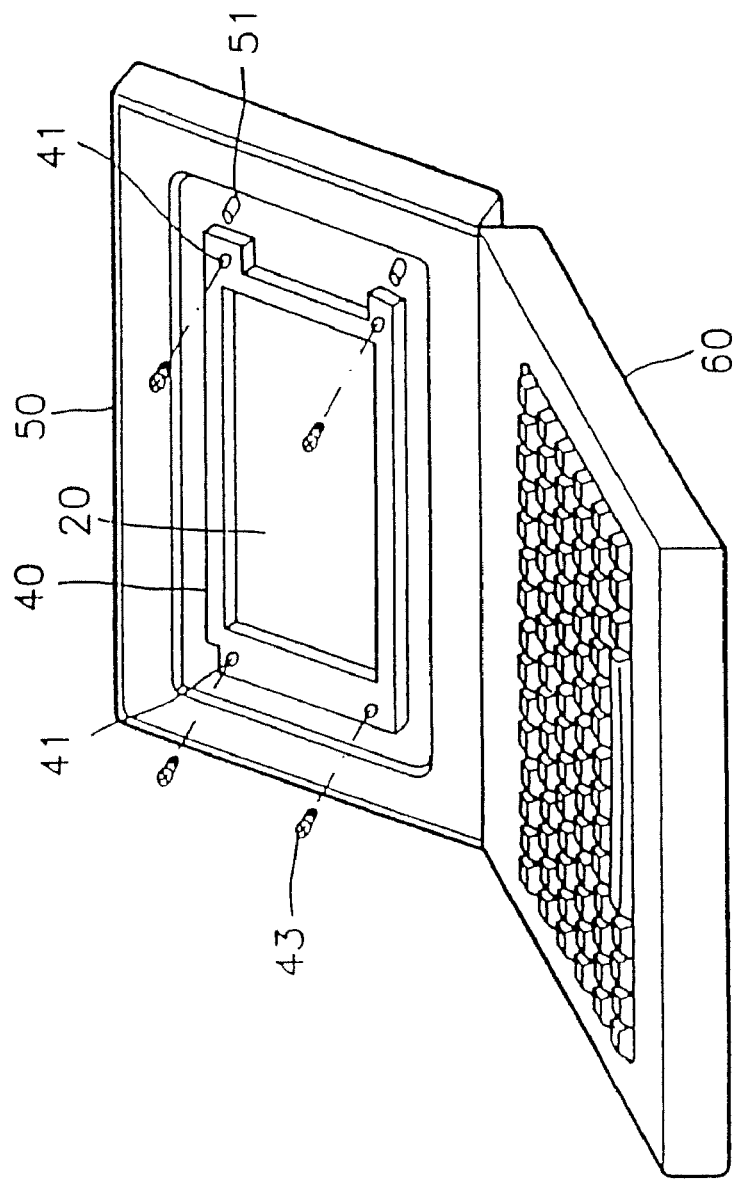
FIG. 5 shows an assembly structure of the liquid crystal display device in the conventional portable computer.
Figure 6:
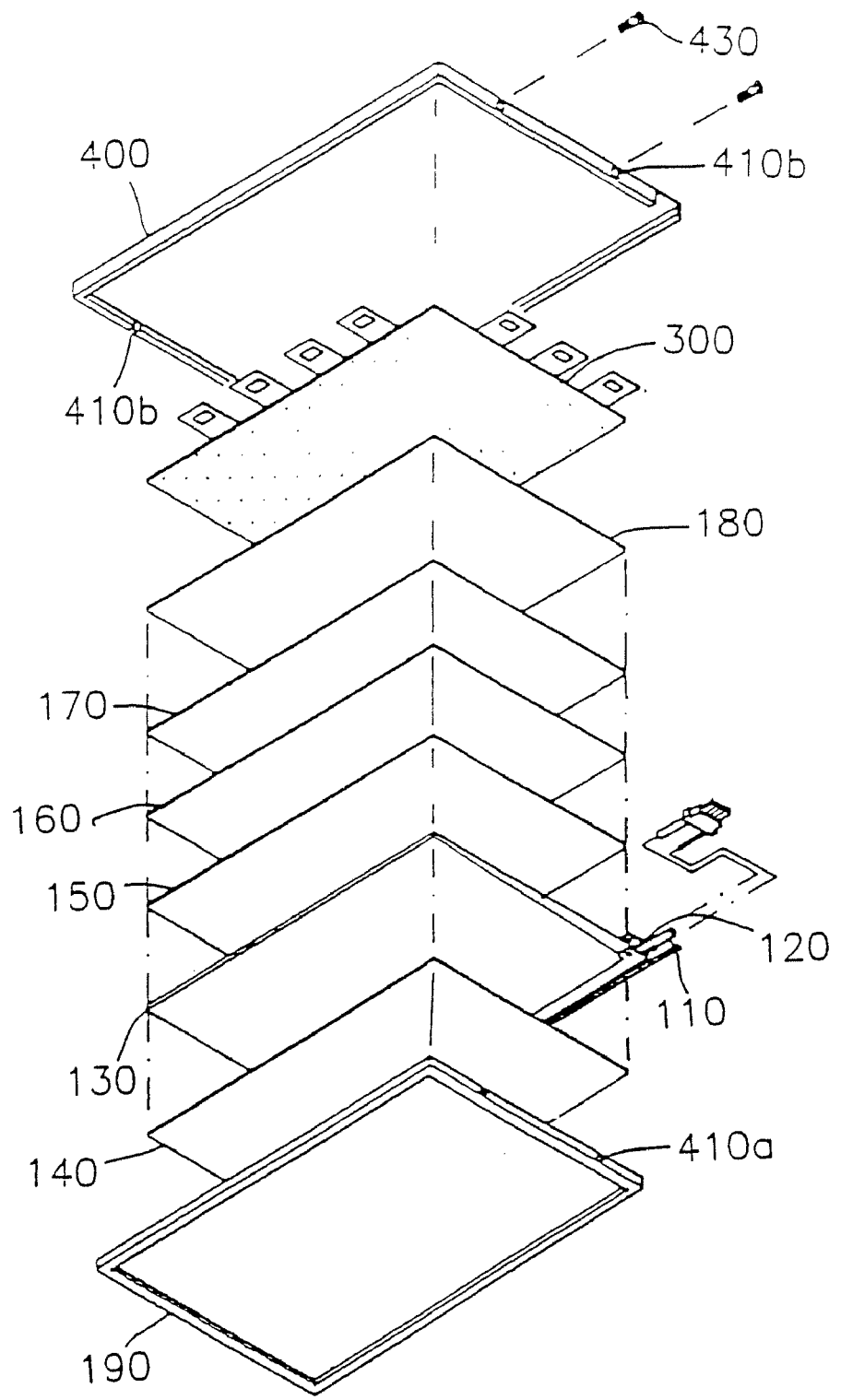
FIG. 6 is a perspective view showing the assembly structure of the parts of the back light unit in accordance with the present invention.
Figure 8:
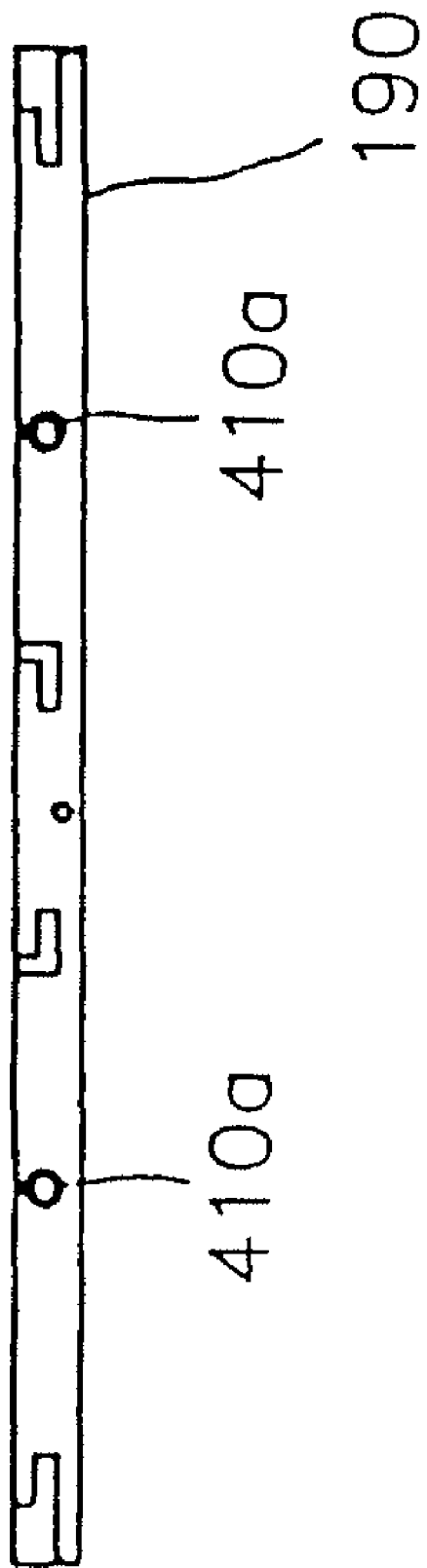
FIG. 8 is a cross-sectional view of a liquid crystal display according to the present invention illustrating mounting holes at a side of the first fastening frame.

The present invention provides a mounting hole for a fastening element on a side of a liquid crystal display instead of on a front surface of a liquid crystal display. For example, FIG. 8 shows a first mounting hole 410a formed on a first fastening frame 190. With reference to FIG. 6, the structure of a liquid crystal display according to the present invention will be described in detail.

Referring to FIG. 6, on a first support frame 190 made of plastic, for example, a reflector 140, a light guide 130, a protection sheet 150, a first prism sheet 160, a second prism sheet 170, a diffuser 180, and a liquid crystal panel 300 are stacked sequentially. On the side surface of the first support frame 190, a plurality of first screw holes 410a are formed.

At the edge of the light guide 130, a luminescent lamp 110 and a lamp housing 120 are mounted. The lamp housing 120 has an U-shape and surrounds the luminescent lamp 110.

In order to join the first support frame 190, the liquid crystal panel 300, and the lamp housing 120, a second support frame 400 preferably made of metal is mounted at the side surface of the first support frame 190. At the side surface of the second support frame 400, a plurality of second screw holes 410b aligned with the first screw holes 410a are formed.

Figure 7:
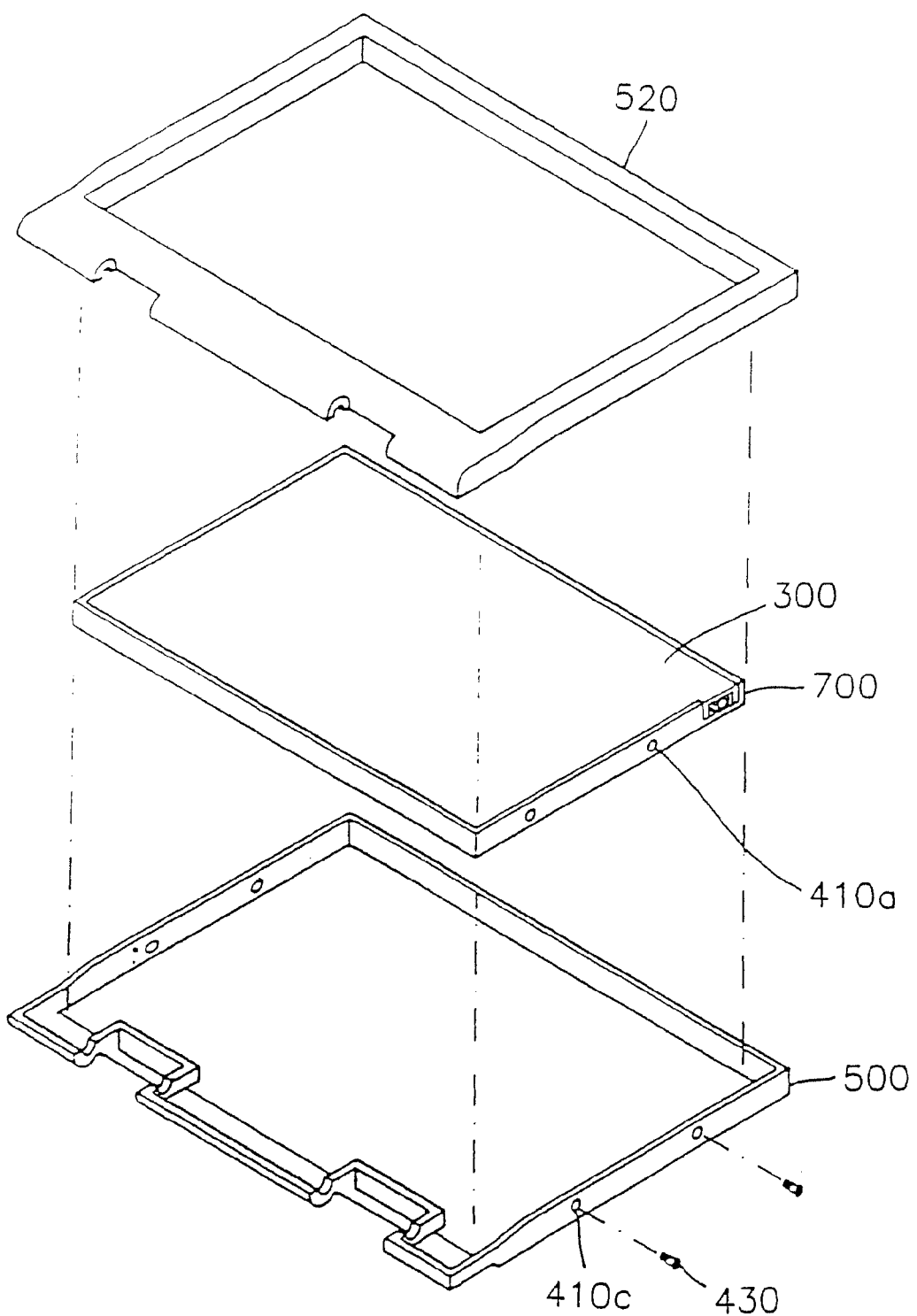
FIG. 7 is a perspective view the assembly structure of the liquid crystal display device, the rear cover, and the front cover in accordance with the present invention.

Referring to FIG. 7, a liquid crystal display device 700 comprising the first support frame 190, the second support frame 400, and the liquid crystal panel 300 is joined with a rear case 500 and a front case 520. At the side surface of the rear case 500, third screw holes 410c aligned with second screw holes 410b are formed. The rear case 500 and the liquid crystal display device 700 are joined to each other by fastening devices such as screws 430, which are locked to the second and third screw holes 410b and 410c. Although not shown in the drawings, the screws 430 are also locked with the first screw holes 410a.

In another embodiment, in order to join the second support frame 400 and the rear case 500, an adhesive device such as double-sided adhesive tape can be used instead of the second and the third screw holes 410*b* and 410*c*. This example has an added advantage in that no screws are needed which makes the manufacturing method easy.

In a further embodiment, the rear case 500 and the second support frame 400 are jointed to each other using hooks and/or other suitable fastening devices including adhesives formed at inner sides of the rear case 500. This embodiment also does not need fastening devices such as screws 430.

Accordingly, in the present invention, the assembling or fastening devices are located at the side surface of the display and not at the front or back side. The assembling devices are preferably screws, hooks or, adhesive materials, for example. The direction of the assembling devices is normal to the side surface of the display, that is, parallel direction with the front (viewing) surface of the display. Moreover, the assembling devices may be formed on the upper and lower sides of the display.

Figure 9:
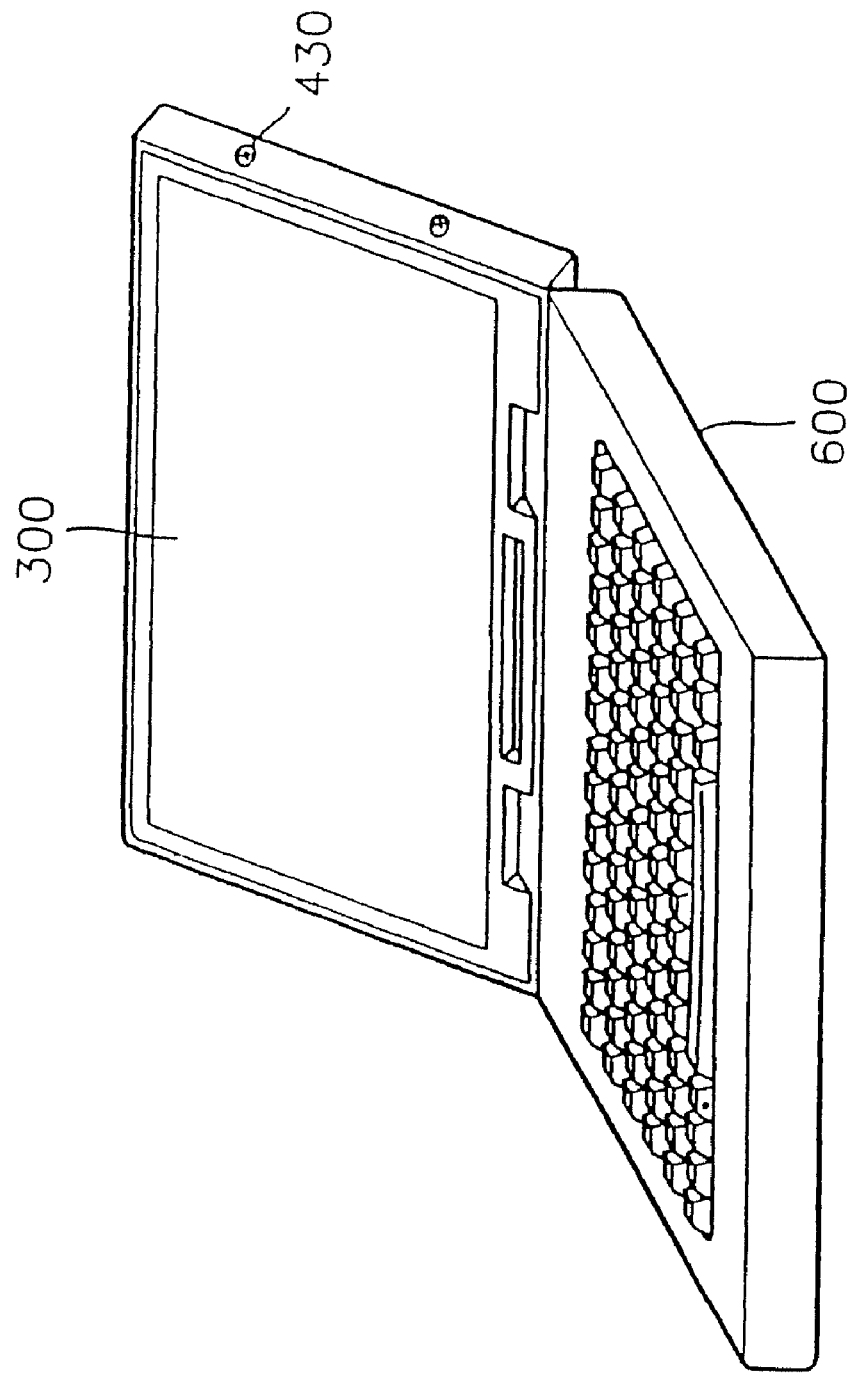
FIG. 9 shows an assembly structure of the liquid crystal display device and portable computer in accordance with the present invention.

Referring to FIG. 9, the liquid crystal display is mounted to the portable computer. One of the advantages of the portable computer according to the present invention over the conventional portable computer is the higher ratio of the viewing area. Because there are no fastening elements on the display surface, the outer frame of the display area of the present invention is narrower than that of conventional ones. Thus, the ratio of the viewing area can be maximized and the thickness of the display part is made thinner than that of conventional ones.

Furthermore, as the volume of the frames of the present invention is smaller than that of conventional ones, the portable computer of the present invention is lighter. Additionally, as it is not necessary to have screws, the cost for manufacturing can be reduced.

It will be apparent to those skilled in the art that various modifications and variations can be made in the computer having liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a first structure having a plurality of side surfaces;
a second structure;
a liquid crystal panel between the first structure and second structure and having a display surface substantially nonparallel to the plurality of side surfaces; and
fixing means provided between the plurality of side surfaces and the second structure, fixing the first structure to the second structure in a direction substantially nonperpendicular to the display surface,
wherein the first structure includes a front surface substantially parallel to the display surface and wherein the front surface has only a single opening positioned so that a portion of the display surface is not covered by the front surface.

2. The liquid crystal display device according to claim 1, wherein the fixing means includes at least one hole formed in the side surfaces.

3. The liquid crystal display device according to claim 1, wherein the fixing means includes at least one screw.

4. The liquid crystal display device according to claim 1, wherein the fixing means includes adhesive material.

5. A method of fabricating a display device comprising:
providing a display panel, the display panel comprising a display surface;
providing a first structure adjacent the display panel, the first structure comprising side surfaces substantially nonadjacent and nonparallel to the display surface;
providing a second structure adjacent a portion of the first structure; and
immovably fixing the display panel between the first and second structures by fixedly coupling the first and second structures at the side surfaces in a direction substantially nonperpendicular to the display surface,
wherein the first structure includes a front surface substantially parallel to the display surface and wherein the front surface has only a single opening positioned so that a portion of the display surface is not covered by the front surface.

6. The method of fabricating the display device according to claim 5, wherein the first and second structures are fixedly coupled using adhesive material.

7. The method of fabricating the display device according to claim 5, wherein the first and second structures are fixedly coupled using screws.

8. The method of fabricating the display device according to claim 5, wherein the first and second structures are fixedly coupled using holes.

9. The method of fabricating the display device according to claim 5, wherein the display panel comprises a liquid crystal display panel.

10. The method of fabricating the display device according to claim 5, wherein the side surfaces comprise holes and wherein the first and second frames are fixedly coupled via screws extending beyond the second frame into the holes.

* * * * *